United States Patent Office 2,955,724
Patented Oct. 11, 1960

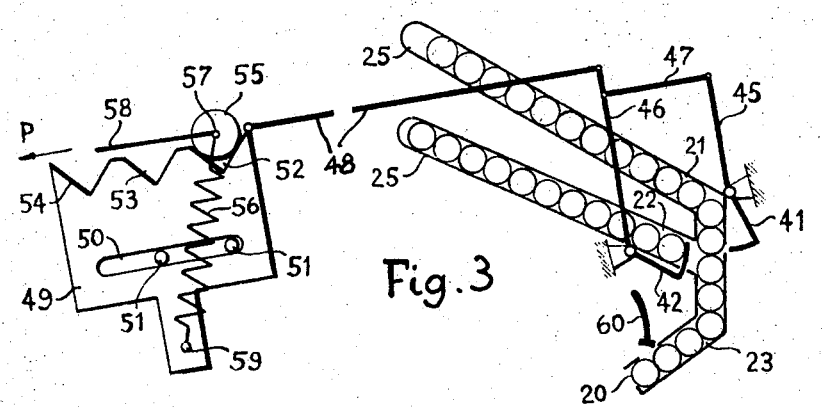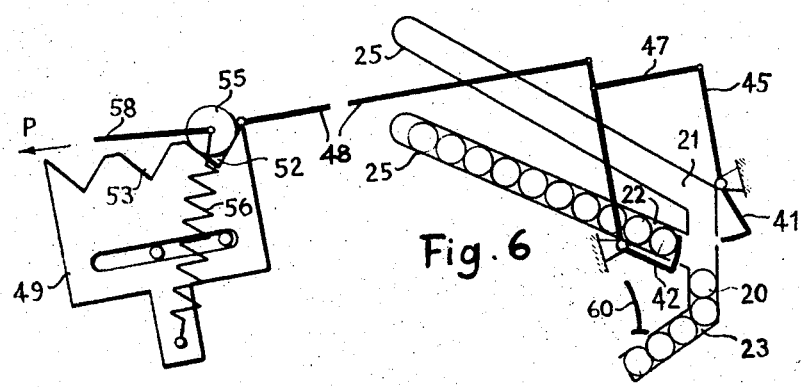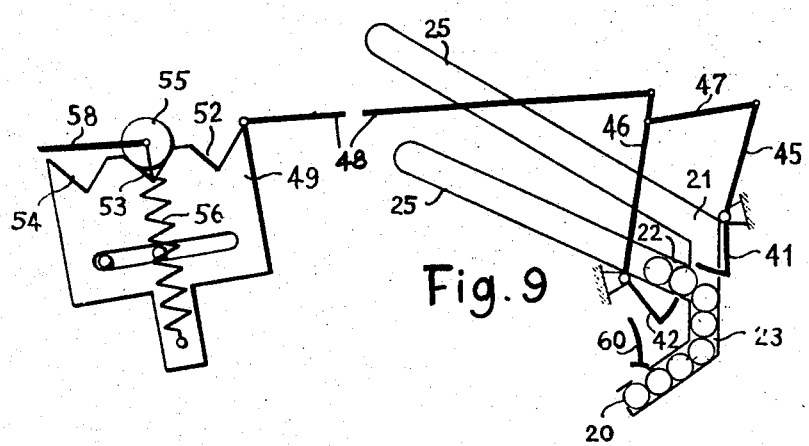

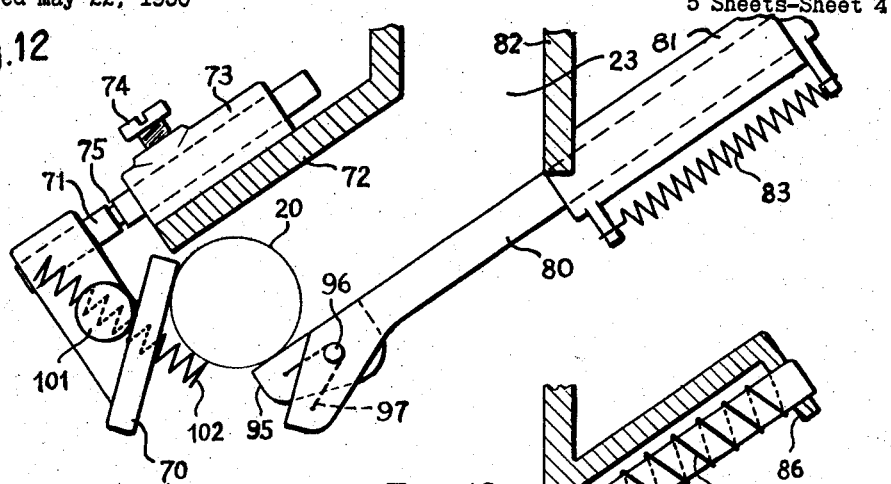
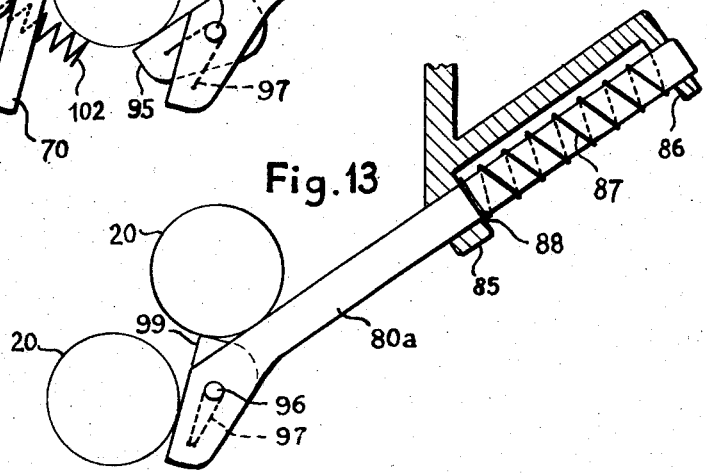
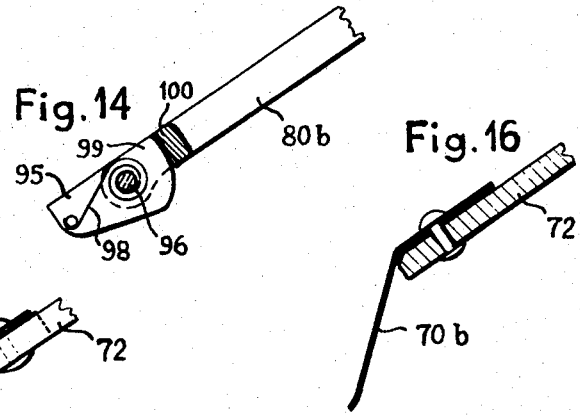
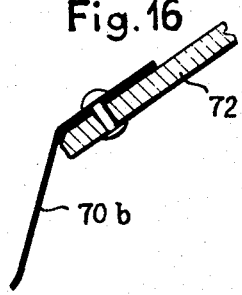
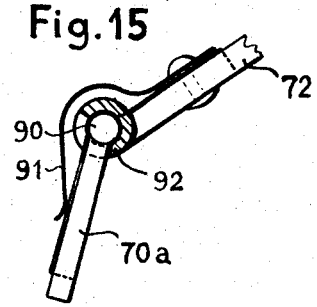

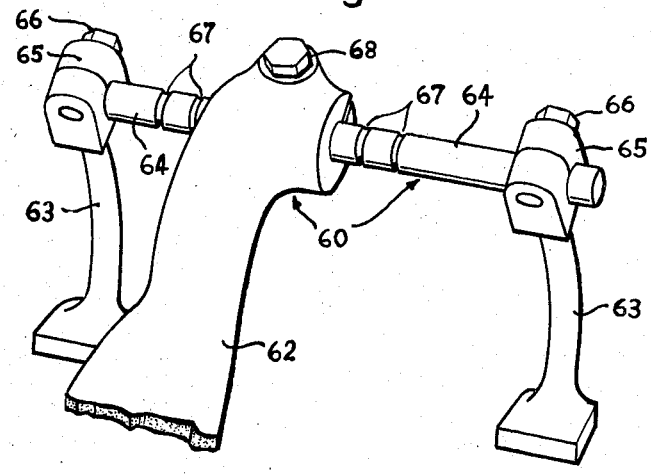

2,955,724
AUTOMATIC BOBBIN-CHANGING MECHANISM FOR LOOMS

Adolf Heinrich Deucher, Zurcherstrasse, Rapperswil, Switzerland

Filed May 22, 1956, Ser. No. 586,431

Claims priority, application Switzerland June 1, 1955

3 Claims. (Cl. 221—11)

The present invention relates to an automatic bobbin-changing mechanism for looms. The mechanism according to the invention is principally characterized by at least two magazines which are each adapted to receive a single row of full bobbins and are singly removably and exchangeably connected to allocated supply ways which open into one common channel leading to the bobbin-changing place.

Other features of the invention will be apparent from the following description and claims, taken in conjunction with the accompanying drawings, wherein one form of embodiment together with some variants are illustrated by way of example.

Figs. 3 to 11 show diagrammatically the same mechanism with its control gear in different phases of operation;

Fig. 12 represents a detail of Fig. 1 on a larger scale;

Fig. 13 shows part of a modified form to Fig. 12, in a different working phase;

Fig. 14 is a vertical section through another modified form of the same part;

Fig. 15 shows a modified embodiment of another part of Fig. 12, and

Fig. 16 is the similar representation of a further modified form of this part, and Fig. 17 shows diagrammatically a hammer for pushing the bobbins into the shuttle.

Figure 1:
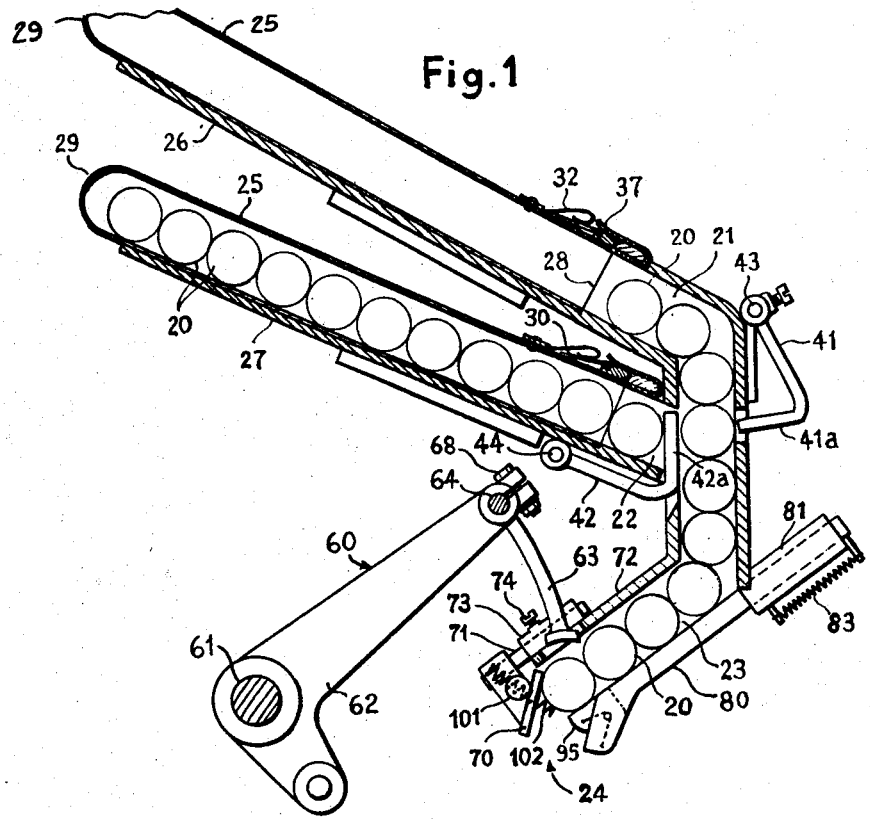
Fig. 1 shows a vertical section through a mechanism with two mounted bobbin magazines.

The mechanism as shown in Fig. 1 on an automatic loom includes two supply ways 21 and 22 for weft bobbins 20 which are only diagrammatically represented by their circular outlines. The two supply ways 21 and 22 open into one common channel 23 which leads to the bobbin-changing place 24. Both the supply ways 21 and 22 as well as the channel 23 are so dimensioned in width that the bobbins can only pass through consecutively.

Each of the two supply ways 21 and 22 has connected thereto a bobbin magazine 25 designed to receive a single row of fully wound pirns 20. The magazines are disposed singly detachable and exchangeable, they being placed on guide rails 26 and 27 respectively in such a way as to extend over each other in spaced relationship at a slant with respect to the vertical. Each of the magazines has an opening 28 open towards the allocated supply way 21 and 22 respectively, and through which the bobbins can by gravity descend thereinto. At their ends 29 remote from the ways 21 and 22, the magazines are closed in such a way that, when removed, they must be filled with bobbins 20 through the openings 28.

Figure 2:
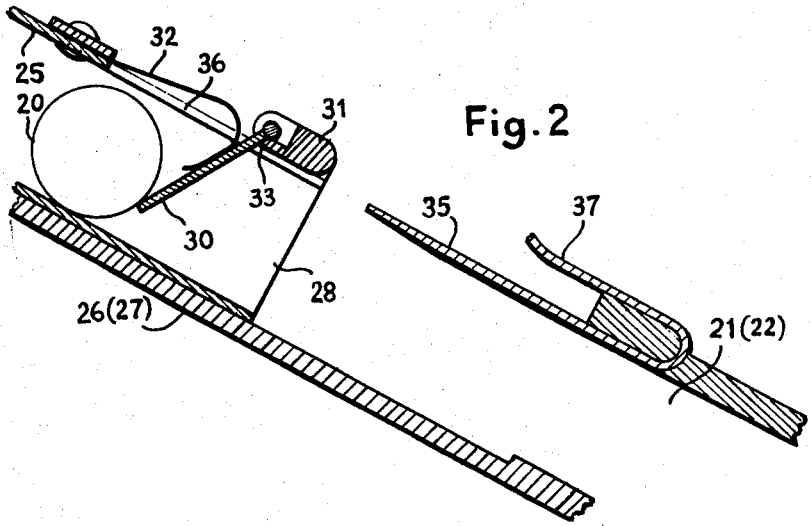
Fig. 2 shows a detail of Fig. 1 on a larger scale, during the mounting of a bobbin magazine.

In the vicinity of the opening 28, each magazine 25 has a movable latch 30 which, according to Fig. 2, is swivably supported on a bearing block 31 mounted on the related magazine. The latch 30 is under the influence of a leaf spring 32 which is fixed on the magazine 25 and tends to bring the latch 30 from within the magazine in front of the opening 28 to prevent the bobbins 20 from falling out when the magazine is being transported. The spring 32 then presses the latch 30 towards a stop 33 which is formed on the bearing block 31 and determines the locking position of the latch 30.

Each of the supply ways 21 and 22 has allocated thereto a member 35 which, according to Fig. 2, extends parallel to the guide rails 26 and 27 respectively, and can engage a recess 36 in the bobbin magazine 25 when the same is being applied. Thereby the member 35 engages below the bearing block 31 and cooperates with the latch 30 in such a way that the latter, with magazine 25 closed, is forced into an inoperative position to allow the bobbins 20 from the magazine 25 to reach the related supply way 21 or 22 respectively, as shown in Fig. 1. On taking one of the magazines 25 from the loom, the member 35 automatically becomes disengaged from the recess 36 and the spring 32 can swing the latch 30 into the locking position to prevent any bobbins still present in the magazine 25 from falling out. Over each member 35 there is a lug 37, between which and the related member 35 the bearing block 31 of a magazine 25 can be pushed in. The lug 37 ensures that, with magazine 25 on, its opening 28 coincides with the related supply way 21 or 22. The guide rails 26, 27 together with the parts 35 and 37 form retaining devices adapted to enable connection of the magazines 25 to the supply ways 21 and 22.

At the points, where the supply ways 21 and 22 open into the common channel 23 two movable locking members 41 and 42 are provided. These include levers pivotal about axles 43 and 44 on the walls limiting the supply ways 21 and 22, each of which levers possesses an effective portion 41a and 42a respectively, curved in the swinging direction, which, according to the position of oscillation of the related locking member, projects either crosswise into the related supply way 21 or 22, as is the case in Fig. 1 for the portion 42a of the locking member 42, or is then disengaged from the related guide way 21 or 22, as is the case in Fig. 1 for the portion 41a of the locking member 41. With the effective portion 42a of the locking member 42 projecting into the supply way 22 according to Fig. 1, the latter is locked towards the common channel 23 and the portion 42a forms a guide face for the bobbins 20 in the other guide way 21. If, however, the effective portion 41a of the locking member 41 projects into the supply way 21, this becomes locked and the portion 41a forms a guide face for the bobbins 20 passing over into the common channel from the other guide way 22.

Both locking members 41 and 42 are positively coupled to each other so as to alternately open and lock one of the guide ways 21 and 22 towards the common channel 23. To that effect the locking members 41 and 42 are rigidly mounted for rotation with the axles 43 and 44, and arranged on these axles are lever arms 45 and 46 which are only diagrammatically shown in Figs. 3, 6 and 9. These two lever arms 45 and 46 are interconnected by a link 47.

Pivoted to one lever arm 46 is moreover one end of a push-and-pull rod 48, the other end of which is jointed to a coupling part 49. The latter has a guide slot 50 formed therein and engaged by two guide pins 51 stationarily mounted on the loom frame. Formed on the coupling part 49 are three notch-like depressions 52, 53 and 54 with which cooperates a second roller-shaped coupling part 55. One end of a tension spring 56 is at 59 anchored to the first coupling part 49, while the other end engages an axle 57 of the second coupling part 55. The spring 56 tends to keep the roller-shaped coupling part 55 in engagement with one of said notches 52, 53 and 54. The axle 57 is further engaged by one end of a second push-and-pull rod 58, the other end of which is operatively connected to a mechanism of the loom, working when the bobbins change. Being in principle known in conventional automatic looms, this mechanism is omitted in the drawing. For instance, upon change of the weft bobbin, the stop motion is actuated and, for driving same, the rod 58 may be connected to the mechanism.

The coupling parts 49 and 55 form together a coupling device which yieldingly interconnects the two push-and-pull rods 48 and 58 and thus the locking members 41 and 42 to the said mechanism when bobbins change, as described in more detail hereinafter.

The mechanism shown in Fig. 1 incorporates a hammer 60 known per se in the art, which each time has to push the lowermost bobbin 20 from the common channel 23 into the shuttle, if a bobbin-change has to take place. The hammer 60 consists of an angle lever 62 pivotal about an axle 61, two hammer fore-parts 63 and a bolt 64, by means of which the fore-parts 63 are connected to the angle lever 62, as particularly shown also in Fig. 17.

The action of the aforedescribed mechanism is as follows:

The magazines 25 are filled with fully wound weft bobbins away from the loom, say, in the pirn winder, by bringing the bobbins one after the other through the openings 28 into the magazine 25. Thereby the latches 30 are swivelled into the inoperative position by the bobbins themselves against the action of the springs 32. The filled bobbin magazines 25 are then connected to the supply ways 21 and 22 of the loom, simply by fitting the magazines onto the corresponding retaining devices 26, 27, 35, 37.

Figure 5:
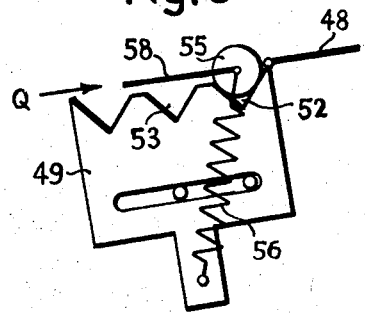
Figure 4:
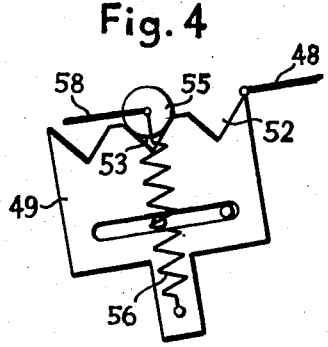

Suppose now the locking members 41 and 42 be in the position as in Figs. 1 and 3, i.e. the supply way 21 be open towards the common channel 23, while the other supply way 22 is locked. If the weft in the shuttle is substantially spent, the apparatus for the bobbin-change comes automatically into action. Upon operation of the bobbin change apparatus, the rod 58 will be moved in the direction of the arrow P in Fig. 3. Incidentally this rod 58 also tends via coupling device 49, 55 to move the rod 48 in the same direction, and thus to swivel the locking members 41 and 42 in Fig. 3 anticlockwise. But since the locking member 42 already abuts on the lower wall limiting the supply way 22, the rod 48 cannot move in the direction of the arrow P. Consequently, when the rod 58 moves, the roller 55 will be caused to spring out of the notch 52 and into the notch 53 of the coupling part 49, as shown in Fig. 4. Incidentally the lowermost bobbin 20 will be pushed by the hammer 60 from the channel 23 into the shuttle and the spent pirn simultaneously ejected therefrom. Subsequent to this, the rod 58 is moved by the bobbin-changing apparatus in a direction opposed to that of the arrow P, i.e. according to the arrow Q in Fig. 5, thereby also tending to displace the rod 48 in the same way via coupling device 49, 55. The locking members 41 and 42 are urged thereby to perform a clockwise movement of oscillation (in Figs. 1 and 3), which, however, is prevented by a bobbin 20 lying in front of the effective portion 41a of the member 41. The rod 48 thus cannot move, and the roller 55 springs against into the notch 52, as shown in Fig. 5. Meanwhile the hammer 60 has been restored to its initial position, and the next bobbin 20 rolls under the hammer 60, whereby another bobbin follows in the channel 23 from the supply way 21 or adjoining magazine 25.

Figure 8:
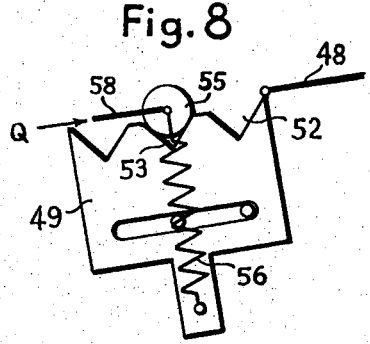
Figure 7:
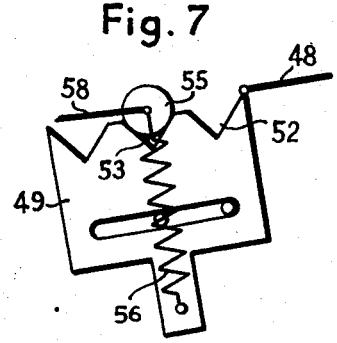

The described operations will repeat at each bobbin-change as long as a bobbin 20 is present in the supply way 21 to prevent the locking member 41 from oscillating. If this is no longer the case, the condition according to Fig. 6 will result. In the following bobbin-change the rod 58 is again worked to the left according to the arrow P in Fig. 6, which movement the rod 48 cannot follow, so that the roller 55 springs into the intermediate notch 53 of the coupling part 49, as shown in Fig. 7. In the subsequent return movement of the rod 58 according to arrow Q in Fig. 8, the rod 48 is carried along in the same sense via coupling device 49, 55, because no bobbin then prevents the locking member 41 from swivelling. The two locking members 41 and 42 will consequently be changed over and assume the position as visible in Fig. 9. Now the supply way 22 is open towards the channel 23, whereas the emptied supply way 21 is locked.

Figure 11:
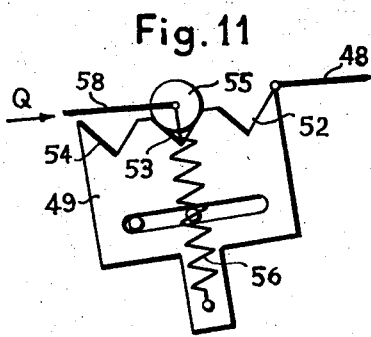
Figure 10:
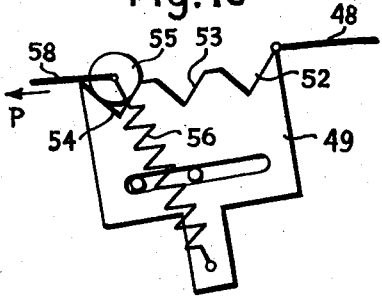

In the following bobbin-changes, the rod 58 will each time be first moved to the left according to arrow P in Fig. 10, whereby the roller 55 will change from the intermediate notch 53 into the notch 54, since the rod 48 is prevented from moving in the same sense, because a bobbin 20 in the supply way 22 lies in front of the effective part 42a of the locking member 42 and secures it from swivelling. In the subsequent return movement of the rod 58 according to arrow Q in Fig. 11, the roller 55 again springs back into the intermediate notch 53, since due to abutment of the locking member 41 on the neighboring limiting wall of the guide way 21, any movement of the rod 48 in the sense of the arrow Q is rendered impossible. Therefore the channel 23 is fed from the supply way 22 upon each bobbin-change, as long as bobbins 20 are present therein, and also if a magazine 25 filled with bobbins has meanwhile been connected to the upper supply way 21.

If there are no longer bobbins 20 in the supply way 22, the locking members 41 and 42 are changed over at the next bobbin-change, i.e. during the movement of the rod 58 according to the arrow P, the rod 48 will be carried along in the same direction, whereby the roller 55 remains in the intermediate notch 53 of the coupling part 49. Now the supply way 22 is locked and the supply way 21 opened. If bobbins have been again introduced into the latter by connecting a magazine 25 filled with bobbins, one of these bobbins will prevent the locking members 41 and 42 from again changing over during the subsequent return movement of the rod 58 in the direction of the arrow Q. Consequently the roller 55 springs into the notch 52, and the condition according to Fig. 3 is again attained.

If, however, both supply ways 21 and 22 are empty, the locking members 41 and 42, at each bobbin-change, will take the position as shown in Fig. 3, when the rod 58 moves according to the arrow P; and subsequently the position as in Fig. 9, if the rod 58 moves back according to the arrow Q. These operations will repeat as long as there are bobbins 20 in the common channel 23, and until one of the supply ways 21 and 22 is refilled with fully wound bobbins. According to whether the bobbins are first filled into the supply way 21 or into the supply way 22, the operations take place as described with reference to Figs. 3–5 or with reference to Figs. 9–11.

Summarizing it can be said that the disclosed mechanism permits of automatically changing over the locking members 41 and 42 at each bobbin-change, provided there are no longer bobbins in the hitherto open supply way 21 or 22, whereas if at least one bobbin is present in the open supply way, this bobbin itself prevents the locking members 41 and 42 from changing over. In the operation of the loom, the emptied magazines 25 may be removed at any desired moment and replaced by magazines filled with bobbins.

The yielding connection between the rods 48 and 58 required for attaining the aforedescribed functions may also be brought about by a coupling device other than the 49, 55 as described.

The mechanism also incorporates the following features:

According to Fig. 17 the two fore-parts 63 of the hammer 60 are attached to the end portions of the bolt 64 by means of clamping members 65 with clamping screws 66. Upon loosening the latter, the fore-parts 63 can be individually swiveled round the bolt 64 for positioning with respect to the bobbin to be pushed into the shuttle and momentarily lying in the range of the hammer. The bolt 64 forms an intermediate piece between the angle lever 62 and the hammer fore-parts 63, and is provided with several circumferential grooves 67 forming predetermined breaking places.

Should for any reason during bobbin-change the full pirn springing into the shuttle becomes jammed when the hammer 60 operates, unduly high mechanical stresses of interacting parts may set up. In this case the circumferential grooves 67 will cause breakage of the bolt 64 at one of these grooves 67, when such stresses set up. Thus destruction and damaging of other expensive components of the loom will be avoided. The broken bolt 64 may be taken out in a comparatively simple and rapid way and be replaced by a fresh one. The clamping screws 66 of the hammer fore-parts 63 and a clamping screw 68 on the angle lever 62 need only to be loosened, and retightened when changing the bolt.

The outlet opening of the common channel 23 lying at the bobbin-changing place is limited towards the front by a wall piece 70 which, by means of two bolts 71, is adjustably connected to a fixed wall 72 of the channel 23. In Figs. 1 and 12 only one of these bolts is visible, the other lying exactly behind the one shown. Each of the bolts 71 is let into a sleeve 73 disposed at the wall and retained in position by a clamping screw 74. The bolts 71 form intermediate pieces between the fixed wall 72 and the adjustable wall part 70, and they are each provided with a circumferential groove 75 for the purpose of forming predetermined breaking places.

As is known, failures in bobbin-change may occur if a bobbin is not completely pushed into the shuttle and is partially caught at the outlet of the channel 23. With the subsequent movement of the sley, the bobbin will be carried along and out of the channel 23, crosswise to the outlet direction of the bobbin. If such a movement is directed forwards, the caught bobbin will strike against the wall part 70. Thereby the bolts 71 will break at the circumferential groove 75 and thus avoid any damaging or destruction of other components of the loom. The bolts 71 can be replaced comparatively easily.

Downwards and to the rear, the channel 23 and its outlet are limited by several bar-like wall parts 80 which are all hidden by the one shown in Figs. 1 and 12. These wall parts 80 are carried lengthwise displaceable in guide sleeves 81 which are secured to a fixed wall 82 of the channel 23. Each wall part 80 has allocated thereto a tension spring 83 which at one end engages the related guide sleeve 81 and at the other end the wall part 80. The springs 83 tend to keep the wall parts 80 in the position as illustrated.

Should, due to failure in the bobbin-change, a bobbin be caught in the outlet of the channel 23 and be then moved to the rear by the sley, i.e. to the right in Figs. 1 and 12, the bobbin will strike against the forward end of the wall parts 80, and these will be pushed back against the action of the springs 83. By this resilient arranging of the wall parts 80, destruction of other parts of the loom will also be avoided.

Fig. 13 shows a modified form of embodiment, wherein the displaceable bar-like wall parts 80a are each located in two guiding eyelets 85 and 86 having therebetween a compression spring 87 wound round the related part 80a. Said spring bears with its one end on the rear guiding eyelet 86 and with its forward end on a spreading ring 88 which engages a circumferential groove of the related part 80a.

In another modified form to Fig. 12, shown in Fig. 15, a wall part 70a limiting the outlet towards the front is hingedly supported on the fixed wall 72 by means of an axle 90. A leaf spring 91 tends to swivel the wall part 70a towards a stop 92 to hold same in the operative position. If, incidental to failure in bobbin-change, a bobbin caught in the outlet of the channel 23 be carried forward by the sley, i.e. to the left in Fig. 15, the wall part 70a will be swung outwards against the action of the spring 91, whereby any breakage in components of the loom will be avoided.

The same aim will also be achieved by the modified form as shown in Fig. 16, in which a wall part 70b limiting the outlet towards the front, is itself constituted by a leaf spring which incidental to any unduly high mechanical stress may deflect outwards. Instead of a single leaf spring 70b also several such springs may be arranged side by side.

To prevent the bobbins 20 from escaping downwards by themselves out of the channel 23, in the range of the outlet there is provided a pair of flaps 95 each swivably disposed round an axle 96 at the forward end of the wall parts 80 and 80b respectively, as shown in Figs. 12, 13 and 14. The flap 95 stands under the influence of an allocated limbspring 97 (Figs. 12 and 13) or torsion spring 98 (Fig. 14) which tends to swivel the flap so as to cause it to project into the outlet of the channel 23 as after-rolling preventer, as shown in Figs. 12 and 14. The flap 95 forms one arm of a two-armed lever, the other arm 99 pressing under the action of the springs 97 and 98 respectively against a stop 100, as shown in Fig. 14. The flap 95 can be opened downwards against the power of the springs 97 and 98 respectively, so that by means of the hammer 60 the lowermost bobbin 20 in the channel 23 may simply be ejected downwards. The springs 97 and 98 respectively are so dimensioned that the flap itself cannot be opened by the weight of the overlying bobbins.

With the flap 95 in the open position, Fig. 13, the second lever arm 99 projects into the path of movement of the bobbins 20 and thus prevents them from rolling down when the hammer 60 is about to push the hitherto lowermost bobbin 20 into the shuttle through the outlet of the channel 23. By reason of the described two-armed locking lever 95, 99, failures in the change will be avoided which may especially occur when the loom is stopped at the moment of bobbin-change and subsequently turned back by hand. On being turned back, the hammer 60 raises itself clear of the bobbin pushed half-way into the shuttle, so that it is possible for a second bobbin to roll down onto the bobbin pushed half-way in. On restarting the loom, this would cause a failure in bobbin-change. This danger is precluded by the described locking lever 95, 99, particularly by its second arm 99.

Any one of the bar-like parts 80, 80a or 80b may be provided with such a locking lever 95, 99. In a given case also the provision of one such lever will suffice.

According to Fig. 12, the wall piece 70 has two guide bodies 101 fixed outside, only one of which is visible in the drawing. Each of them has a threaded bore, into which a helical spring 102, of the same pitch as the bore and somewhat clamping therein, is screwed, so that it cannot be displaced because of the vibrations of the operating loom. The helical springs 102 protrude through recesses in the wall part 70 into the outlet of the channel 23, in order likewise to prevent the bobbins 20 from rolling out. When the hammer 60 pushes the lowermost bobbin into the shuttle, that portion of the springs 102 projecting into the outlet becomes bent downwards so that the bobbin can slide past the springs. To suit different bobbin diameters, the springs 102 may be screwed into the outlet to a greater or less extent.

The section of the channel which extends vertically in Figs. 1 and 12 has an internal width which conforms to the desired bobbin diameter, in order that too thick bobbins may be jammed there without entering the range of the hammer 20. The width of this section of the channel 23 is less than the width of the adjoining inclined section below. Oversized bobbins will therefore be caught in the vertically extending section without jeopardizing the hammer or other parts of the loom, and they may be removed by hand from the channel.

It is possible to render adjustable the internal width of the vertical section of the channel 23 by having for instance the rear wall 82 (Fig. 12) designed adjustable in the horizontal direction.

What I claim is:

1. Automatic bobbin-supplying mechanism for looms comprising at least two magazines each adapted to receive a single row of full bobbins, supply ways for the bobbins in connection with the magazines and said supply ways opening into a common channel which leads to the bobbin-changing location, means connected to the supply ways to individually and removably connect the magazines to the associated supply way, movable locking members provided at the openings of the supply ways into the common channel and the locking members being positvely coupled to each other to always cause alternately one or the other of the supply ways to open towards the common channel, and a couplng device interconnecting the locking members with means operating each time when the bobbin is to be changed, the coupling device and the locking members being designed so that an automatic change-over of the locking members takes place if there is no bobbin in the open supply way and any bobbin present in the respective supply way will prevent the locking members from changing over.

2. Automatic bobbin-changing mechanism according to claim 1, in which a movable catch is provided for each magazine adjacent to the outlet thereof and having a spring biassing the catch into a blocking position across the outlet of the magazine so that the bobbins will not fall out during transport of the magazine, said connecting means including a member on each supply way for connecting the magazine to the supply ways, said member, with the magazine connected thereto, urging its catch into an open position in order that the bobbins can enter the related supply way, each catch being pivotally mounted on its magazine and pressed by its spring from within the magazine towards a stop which determines the blocking position of said catch.

3. Automatic bobbin-changing mechanism according to claim 1, in which the coupling device includes a first coupling part wih three notches and a second coupling part which under the influence of an elastic yielding member selectively engages one of said notches for resiliently connecting the two coupling parts with each other.

References Cited in the file of this patent

UNITED STATES PATENTS

| 1,358,044 | Williams | Nov. 9, 1920 |
| 1,385,087 | Matchett | July 9, 1921 |
| 2,119,063 | Wagner | May 31, 1938 |
| 2,165,524 | Wolf | July 11, 1939 |
| 2,407,968 | Von Stoeser | Sept. 17, 1946 |
| 2,783,897 | Farquaharson | Mar. 5, 1957 |

FOREIGN PATENTS

| 3,061 | Great Britain | 1892 |
| 578,297 | Great Britain | June 24, 1946 |